United States Patent [19]

Nozaki

[11] Patent Number: 5,395,495
[45] Date of Patent: Mar. 7, 1995

[54] FABRICATION OF FERROELECTRIC DOMAIN REVERSALS

[75] Inventor: Nobuharu Nozaki, Kanagawa, Japan

[73] Assignee: Fuji Photo Film Co., Ltd., Kanagawa, Japan

[21] Appl. No.: 44,457

[22] Filed: Apr. 9, 1993

[30] Foreign Application Priority Data

Apr. 16, 1992 [JP] Japan .................................. 4-096571

[51] Int. Cl.$^6$ .............................................. C01B 33/00
[52] U.S. Cl. ........................... 204/157.44; 204/157.41; 204/157.15
[58] Field of Search ...................... 204/157.41, 157.44, 204/157.15

[56] References Cited

U.S. PATENT DOCUMENTS

5,036,220  7/1991  Byer et al. ............................ 359/328

OTHER PUBLICATIONS

Optics Letter, vol. 16, No. 15, Aug. 1, 1991 "Milliwatt-order blue-light generation in a periodically domain-inverted LiTaO$_3$ waveguide" pp. 1156–1158, by K. Yamamoto et al.

Electronics Letters, vol. 27, No. 14, Jul. 4, 1991 "Fabrication of periodic domain grating in LiNbO$_3$ by electron beam writing for application of nonlinear optical processes" pp. 1221–1222, by H. Ito et al.

"Interactions Between Light Waves in a Nonlinear Dielectric", *Physics Review*, J. A. Armstrong et al., vol. 127, No. 6, 1962, pp. 1918–1939.

*Primary Examiner*—John Niebling
*Assistant Examiner*—Cybille Delacroix-Muirheid
*Attorney, Agent, or Firm*—Sughrue, Mion, Zinn, Macpeak & Seas

[57] ABSTRACT

The fabrication method for ferroelectric domain reversals wherein domain reversals are definitely produced in the vicinity of the surface of a ferroelectric by radiating a charged particle beam onto the ferroelectric. An SiO$_2$ film 2 whose electrical resistance is higher than that of LiNbO$_3$ is deposited on the surface of a substrate which is exposed to an electron beam, thereby fabricating domain reversals which extend along the direction an electron beam radiation.

8 Claims, 3 Drawing Sheets

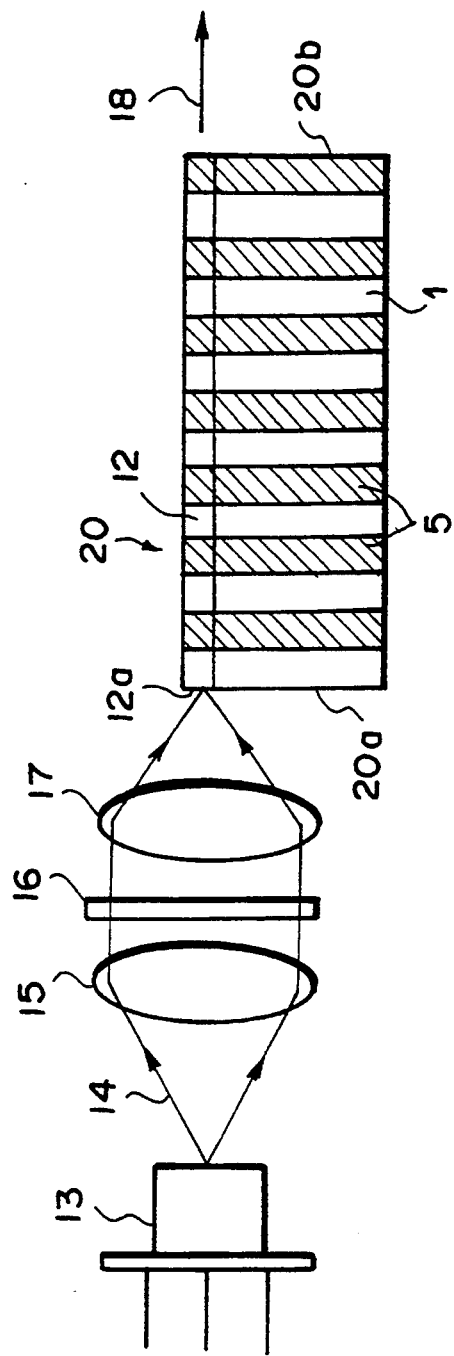

FABRICATION OF FERROELECTRIC DOMAIN REVERSALS

BACKGROUND OF THE INVENTION

1. Field of the Invention

This invention relates to the fabrication of domain reversals in a predetermined pattern on a ferroelectric for the purpose of forming an optical wavelength converter element having periodically segmented domain reversals.

1. Description of the Prior Art

A proposal has already been made by Bleombergen et al. in Physics Review vol. 127, No. 6 in 1918 (1962), in which the wavelength of a fundamental wave is converted into a second harmonic wave using an optical wavelength converter element with regions (domains) where the directions of spontaneous polarization of a ferroelectric, possessing the non-linear optical effect, are periodically inverted.

In this method, the fundamental wave can be phase matched with the second harmonic wave by setting the period $\Lambda$ of the domain reversals to be an integral multiple of the coherence length $\Lambda$ which is given by $$\Lambda c = 2\pi / \{\beta(2\omega) - 2\beta(\omega)\} \tag{1}$$

where $\beta(2\omega)$ designates the propagation constant of the second harmonic wave, and $2\beta(\omega)$ represents the propagation constant of the fundamental wave. When wavelength conversions are effected using the bulk crystal of a nonlinear optical material without periodically segmented domain reversals, a wavelength to be phase-matched is limited to the specific wavelength inherent to the crystal. However, in accordance with the above described method, a phase matching (that is, a socalled pseudo phase matching) can be realized efficiently by selecting a period $\Lambda$ satisfying the condition (1) for an arbitrary wavelength.

Examples of known fabrication methods for such periodically segmented domain reversals include 1) the method proposed by K. Yamamoto, K. Mizuuchi, and T. Taniuchi in Optics Letters. Vol. 16, No. 15, pp. 1156 (1991) wherein the $-z$ surface of LiTaO$_3$ is peridocially subjected to proton exchanges, and a resultant structure undergoes a heat treatment around the Curie temperature;

2) the method proposed by H. Ito, C. Takyu, and H. Naba in Electronics Letters, Vol. 27, No. 14, pp. 1221 (1991), wherein electron beams are directly radiated onto the $-z$ surface of unipolarized LiTaO$_3$ or LiNbO$_3$ at room temperature; and 3) the method wherein resists which act to cut off electric charges are laid in a predetermined pattern on the surface of unipolarized LiTaO$_3$ or LiNbO$_3$, or the like, and then electric charges are radiated onto the entire surface by corona electrical discharging techniques.

The technique in which a charged particle beam is radiated onto a ferroelectric can be effected in a relatively simplified manner as seen from the above described second and third, techniques. However, this technique has admitted drawbacks in that domain reversal is difficult to achieve, and the reversal of domains is liable to be indefinite in the vicinity of the surface of a ferroelectric.

With such an indefinite reversal of domains as mentioned above, when the foregoing optical wavelength converter element is formed using a ferroelectric having indefinite domain reversals, no periodically segmented domain reversals will be produced, or it will be impossible to effect an effective wavelength conversion due to the indefinite period of the resultant domain reversals.

In addition, with the indefinite reversal of domains in the vicinity of the surface of a ferroelectric, when an optical waveguide type optical wavelength converter element is formed using such a ferroelectric, there arises a particular problem. Namely, because of the fact that an optical waveguide is formed in the vicinity of the surface of the ferroelectric, even though domain reversals are formed accurately in areas other than the areas adjacent to the surface, either no periodically segmented domain reversals are formed in the optical waveguide where domain reversals are expected to achieve, or the period of the domain reversals becomes inaccurate. With the use of such an optical waveguide type wavelength converter element, it is, as a matter of course, impossible to achieve an efficient wavelength conversion.

SUMMARY OF THE INVENTION

In view of the foregoing observations and descriptions, the principle object of this invention is to provide a fabrication method for ferroelectric domain reversals which allows the formation of domain reversals in a predetermined pattern particularly in the vicinity of the surface of a ferroelectric by the radiation of a charged particle beam.

To this end, according to one aspect of this invention, there is provided a fabrication method for ferroelectric domain reversals in which domain reversals are formed to extend along the direction of a charged particle beam radiation by irradiating the charged particle beam to a unipolarized ferroelectric, wherein the improvement is characterized in that A high resistance layer, having an electrical resistance higher than that of the ferroelectric, has been previously deposited on the surface of the ferroelectric which is exposed to a charged particle beam.

According to the research of the applicants of the present invention, it turned out that the low electric potential of the ferroelectric accounts for the fact that no domain reversals are formed when the ferroelectric is exposed to a charged particle beam. In such a case, either the surface potential of the ferroelectric is immediately reduced when being exposed to a charged particle beam, or a current flows along the surface of the ferroelectric because it is difficult for electrons to migrate depthwise (i.e. the direction of radiation of a charged particle beam).

However, as proposed by this invention, the deposition of the high resistance layer on the surface portion of the ferroelectric prevents immediate drops of the surface potential, and facilitates the migration of electrons from the surface in the depthwise direction of the ferroelectric, thereby ensuring the formation of domain reversals which extend to the direction of radiation of a charge particle beam.

Moreover, the problem that it is hard to produce domain reversals in the vicinity of the surface of the ferroelectric is attributed to the fact that the depth of electron injection from the surface significantly increases within a depth of a few micrometers or thereabouts, particularly when a high energy charged particle beam is used. With the foregoing high resistance layer, the depth of electron injection from the surface of the ferroelectric is reduced by approximately the thickness of this high resistance layer, and hence domain reversals in the vicinity o the surface of the ferroelectric are now possible. Therefore, when an optical waveguide is formed on the surface of the ferroelectric with the removal of the high resistance layer, domain reversals are produced on this optical waveguide without fail.

BRIEF DESCRIPTION OF THE DRAWINGS

FIG. 5 is a schematic side elevation view showing the optical wavelength converter element shown in FIG. 4, when it is in use.

DESCRIPTION OF THE PREFERRED EMBODIMENTS

Referring to the accompanying drawings, the embodiments of this invention will be described in detail hereinbelow.

Figure 1A:
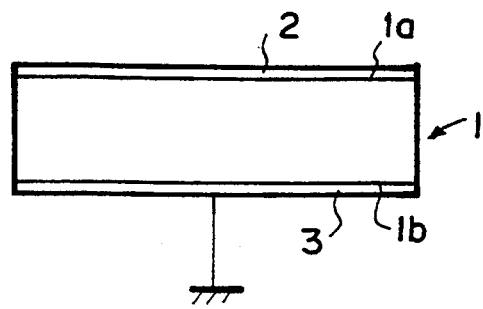
FIG. 1 schematically shows the fabrication of periodically segmented domain reversals according to a first embodiment of this invention.

With reference to FIG. 1, a first embodiment of this invention will be described. In this drawing, reference numeral 1 designates an LiNbO$_3$ substrate (hereinafter referred to as LN substrate) which is made of a ferroelectric possessing the nonlinear optical effect. This LN substrate 1 has been subjected to a unipolarizing treatment, and is formed to a thickness of, for example, 0.5 mm. The z surfaces of this substrate are also optically ground so that the largest nonlinear optical material d$_{33}$ can be effectively utilized. An SiO$_2$ film 2 is deposited on the −z surface 1a of the LN substrate 1 as a high resistance layer having a thickness of 0.5 μm by sputtering techniques as shown in FIG. 1a. A Cr film 3 is also formed as an electrode, on the +z surface 1b of the LN substrate, and this Cr film 3 is grounded.

Figure 1B:
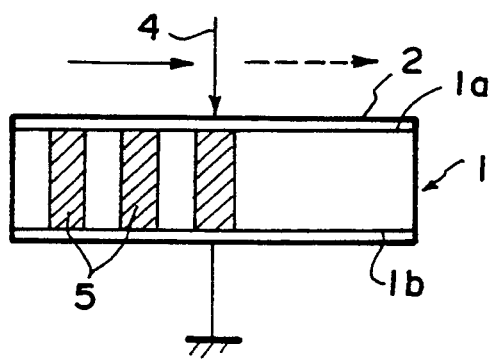

As shown in FIG. 1b, an electron beam 4 is radiated onto the −z surface 1a of the LN substrate 1 through the SiO$_2$ film 2 to form a domain reversal 5 which extends in the direction of an electron beam radiation, or in the depthwise direction from the −z surface 1a. In this embodiment, the electron beam 4 is radiated at a voltage of 20 kV and a current of 0.2 nA. The period of electron radiation for one target region is 3 msec, and target regions are transferred with even pitches each time one target region is exposed to the radiation of an electron beam. In this specific embodiment, the radiation pitch is set to 4 μm. With these processes, periodically segmented domain reversals, in which domain reversals 5 are alternately arrayed with a defined period of Λ=4 μm, are formed.

Figure 1C:
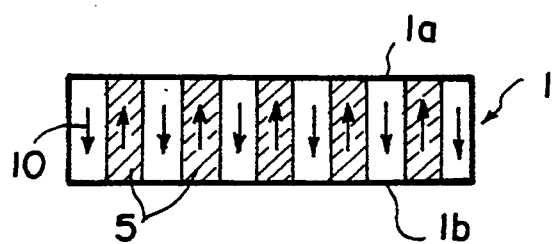
Figure 2:
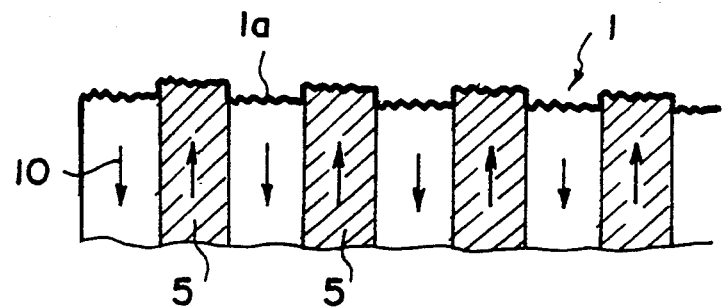
FIG. 2 schematically shows the surface portion of an LN substrate on which periodically segmented domain reversals are formed.

The SiO$_2$ film 2 is then removed by a nitratefluoric acid etching, and the −z surface 1a of the LN substrate 1 is etched (See FIG. 1c). When the −z surface 1a is etched, there arises a difference in etching levels due to a difference in chemical properties between the domain reversals 5 and the rest portions. It is possible to check whether or not domain reversals 5 are surely formed with a given pitch and a given size and, particularly, whether or not domain reversals are definitely produced even in the vicinity of the surface of the LN substrate 1 by the observation of the −z surface 1a using a microscope.

In this embodiment, it was confirmed through this observation that domain reversals, extending from the −z surface to the +z surface at a period of Λ=4 μm, were certainly formed. It was also confirmed that these domain reversals 5 were surely formed in the vicinity of the −z surface 1a of the LN substrate 1. In FIGS. 1c and, 2, the arrow 10 depicts the direction of polarization.

In this embodiment, since the SiO$_2$ film 2, which is uniform in electrical resistance more than LiNbO$_3$, is used as the high resistance layer, the surface resistance of the film when being exposed to the radiation of an electron beam 4 becomes more uniform. In comparison with the ferroelectric without such an SiO$_2$ film 2, the size of each domain reversal 5 becomes more uniform, and the accuracy in periodicity of he periodically segmented domain reversals is increased.

Figure 3:
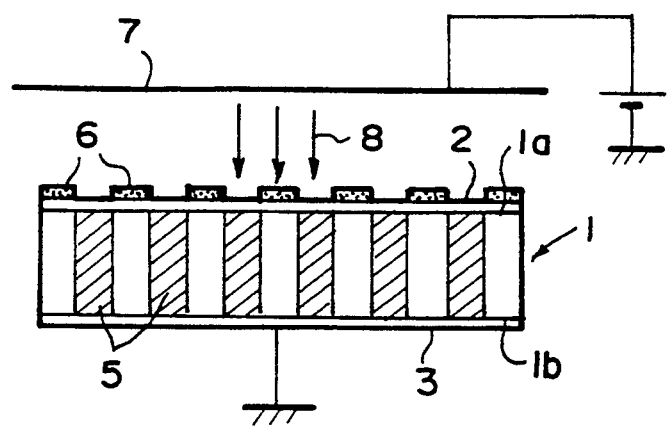
FIG. 3 is the fabrication of periodically segmented domain reversals according to a second embodiment of this invention.

A second embodiment of this invention will now be described with reference to FIG. 3. This embodiment is different from the first embodiment in the way of electron radiation. Specifically, in this embodiment, resists 6 which act to cut off electrons are deposited, as a high resistance layer at given pitches on the top surface of the SiO2 $_2$ film 2, and electrons 8 are radiated onto the −z surface 1a of the LN substrate 1 using a corona electrical discharging wire 7. Eventually, domain reversals are periodically formed in regions of the LN substrate 1 which are uncovered with resist 6

Even in such a case, after the removal of the resists 6, the substrate is then subjected to the etching similar to that of the first embodiment. When the −z surface 1a of the LN substrate 1 was observed with a microscope, it was confirmed that domain reversals are properly formed so as to extend through the substrate from end to end.

Figure 4:
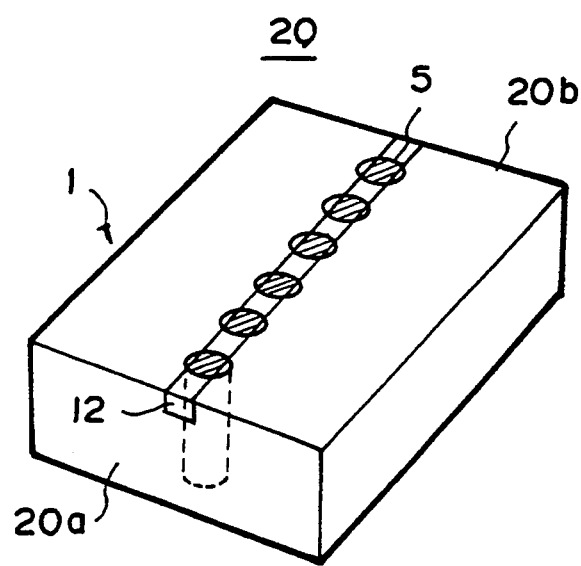
FIG. 4 is a schematic perspective view of a waveguide type optical wavelength converter element having periodically segmented domain reversals.

The waveguide type optical wavelength converter element using the periodically segmented domain reversals that are formed in accordance with this invention will now be described. FIG. 4 illustrates the schematic arrangement of this waveguide type optical wavelength converter element. After the periodically segmented domain reversals 5 are formed on the LN substrate 1 in the same manner as the first embodiment, a channel waveguide 12 is formed so hat light can transmit to the direction of the x axis. This channel waveguide 12 can be formed employing known techniques such as proton exchange techniques.

When a laser beam having a wavelength of λ is introduced, as a fundamental wave, from an input end 20a into the waveguide type optical wavelength converter element 20 which was fabricated in the manner as set forth, the beam then undergoes a waveguide-waveguide mode phase matching, whereby a second harmonic wave having a wavelength of λ/2 can be efficiently emitted from an output end 20b. As one example, an explanation is given of the case where a laser diode is used as the fundamental wave light source with reference to FIG. 5. After a laser beam 14 (wavelength =880 nm), as a fundamental wave, has been exit from a laser diode 13, it is collimated by a collimating lens 15. The polarizing direction of this beam is then aligned to the direction of the z axis of the channel waveguide 12 by means of a λ/2 plate 16, and is converged at the end surface 12a of the channel waveguide 12 when it is condensed by means of a condensing lens 17. Thus, the fundamental wave 14 enters the channel waveguide 12, and travels therethrough.

The fundamental wave 14, which propagates in the waveguide mode, is phase-matched at the periodic domain reversal of the channel waveguide 12, so that the wavelength of the second harmonic wave is converted to a second harmonic wave 18. This second harmonic wave 18 also propagates in the channel waveguide 12 at the waveguide mode, and efficiently leaves from the output end 20b. It will be understood that the largest nonlinear optical constant $d_{33}$ of $LiNbO_3$ is being utilized since the polarizing direction of the outputted second harmonic wave 18 is also aligned in the direction of the z axis.

This invention can be also applied to the case where as the material of a ferroelectric there is used another substance, other than the foregoing $LiNbO_3$, such as $LiTaO_3$, $MgO:LiNbO_3$, $MgO:LiTaO_3$, $KNbO_3$, $MgO:KNbO_3$, KTP, or the like.

The present invention can also be applied to the fabrication of a bulk crystal type optical wavelength converter element having periodically segmented domain reversals. Furthermore, this invention can be applied to the fabrication of domain reversals, except for the periodically segmented domain reversals.

It will be understood that the above description of the present invention is susceptible to various modifications, changes, and adaptations and that the same are intended to be comprehended within the meaning and range of equivalents of the appended claims.

What is claimed is:

1. An improved fabrication method for ferroelectric domain reversals in which domain reversals are formed to extend in a direction defined by a charged particle beam of radiation characterized by the step of irradiating the charged particle beam onto a unipolarized ferroelectric through a high resistance layer having an electrical resistance higher than that of the ferroelectric, said high resistance layer having been previously deposited on the surface of the ferroelectric which is to be exposed to the charged particle beam.

2. The fabrication method for ferroelectric domain reversals as defined in claim 1, wherein each time a target area of the surface is exposed to the charge particle beam for a given period, the ferroelectric is transferred with a given pitch.

3. The fabrication method for ferroelectric domain reversals as defined in claim 1, wherein photoresist which acts as a barrier to the beam is deposited over the high resistance layer with given pitches, and the ferroelectric with the photoresist is exposed to the charged particle beam.

4. In a fabrication method for ferroelectric domain reversals in which domain reversals are formed to extend along the direction of a charged particle beam radiation by irradiating the charged particle beam onto a unipolarized ferroelectric, an improvement comprising the steps of:
   (a) depositing a high resistance layer having an electrical resistance higher than that of the ferroelectric;
   (b) exposing said high resistance layer to a charged particle beam; and
   (c) removing said high resistance layer.

5. The improved fabrication method for ferroelectric domain reversals as recited in clam 4, wherein each time a target area of the surface is exposed to the charge particle beam for a given period, the ferroelectric is transferred with a given pitch.

6. The improved fabrication method for ferroelectric domain reversals as defined in claim 4, wherein photoresist which acts as a barrier to the beam is deposited over the high resistance layer with given pitches, and the ferroelectric with the photoresist is exposed to a charged particle beam.

7. The improved fabrication method for ferroelectric domain reversals as defined in claim 4, wherein said method step (c) comprises the step etching and removing said high resistance layer and wherein said improved method further comprises the step of (d) optically inspecting at least one surface of said ferroelectric for surface variations indicative of formation of said ferroelectric domain reversals.

8. In a fabrication method for ferroelectric domain reversals in which domain reversals are formed to extend along the direction of a charged particle beam radiation by irradiating the charged particle beam onto a unipolarized ferroelectric, an improvement comprising the steps of:
   (a) depositing a high resistance layer having an electrical resistance higher than that of the ferroelectric;
   (b) exposing said high resistance layer to a charged particle beam.

* * * * *